Jan. 16, 1940.   H. C. LORD   2,187,165
METHOD OF CURING PLASTIC MATERIAL AND ARTICLES, AND APPARATUS THEREFOR
Filed Oct. 30, 1935

INVENTOR.
Hugh C. Lord
BY
ATTORNEYS.

Patented Jan. 16, 1940

2,187,165

UNITED STATES PATENT OFFICE 2,187,165

METHOD OF CURING PLASTIC MATERIAL AND ARTICLES, AND APPARATUS THEREFOR

Hugh C. Lord, Erie, Pa.

Application October 30, 1935, Serial No. 47,478

7 Claims. (Cl. 18—17)

This invention is of the same general character as illustrated in Patent No. 1,997,908 issued April 16, 1935. As indicated in the molding of devices such as joints and mountings having an outer shell and an internal bushing of rubber bonded to the shell, the rubber is molded in place within the shell. In the apparatus, and as practiced in the patent, the shell was depended upon for sustaining the pressure on the plastic material as it was treated as by vulcanization. The desirable pressure involved made it necessary to use a heavier shell than might be desirable or required in the finished device. The present invention is designed to correct this fault and provides a pressure tube as a part of the apparatus in which the outer shell of the device is placed so that the pressure which is exerted is sustained by the backing effected by the tube.

Features and details of the invention will appear from the specification and claims.

A preferred embodiment of the apparatus involved in the invention and with which the method may be practiced is illustrated in the accompanying drawing as follows.

1 marks the molding tube; 2, the surrounding steam chamber; 3, a tube enclosing the steam chamber; 4, a steam inlet; 5, a drainage outlet for the steam chamber; 7 shows a ram extension adapted to project into the molding tube 1; 8, a ram plunger operating on the extension; 9, a ram cylinder; 10, an inlet by supplying fluid pressure to the ram; and 11, a valve controlling such pressure. Ropes 12 operating through pulleys exert pressure on the ram plunger 8 through the action of a weight 13 so as to return the ram whenever the fluid pressure is released. A backing plug 14 extends into the tube 1, and forms an abutment against which the mold units are forced by the ram extension.

Figure 1:
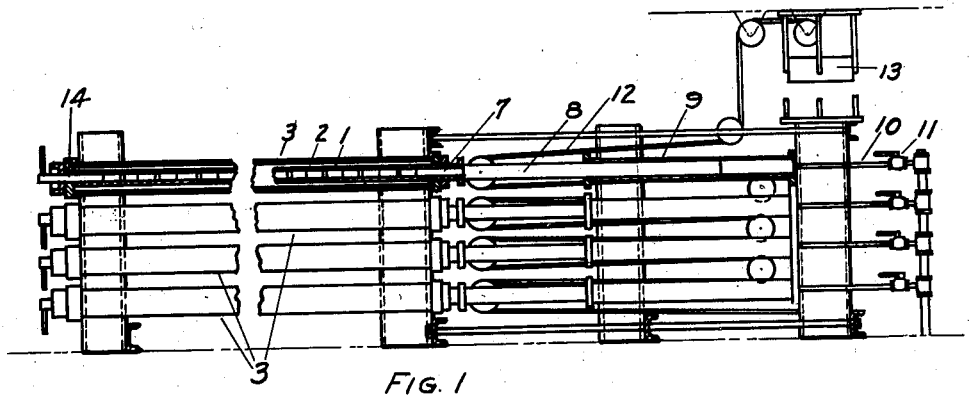
Fig. 1 shows a side elevation of a press partly in sections.
Figure 2:
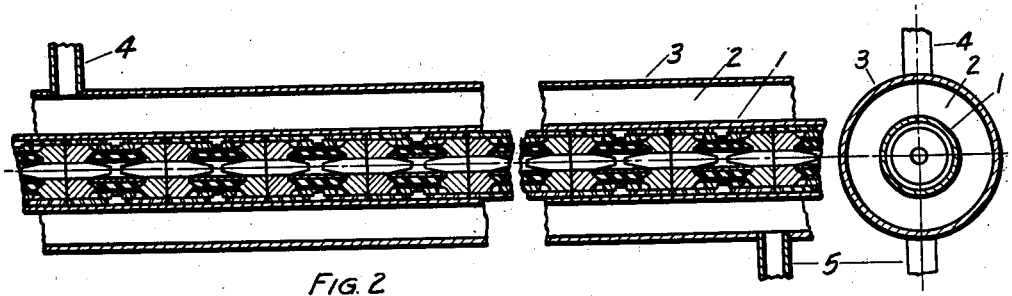
Fig. 2 shows a section of one of the molding tubes.
Figure 3:
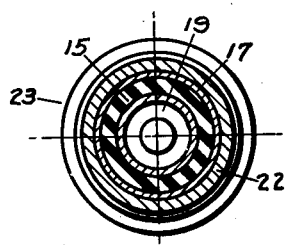
Fig. 3 shows a section on the line 3—3 in Fig. 5.
Figure 4:
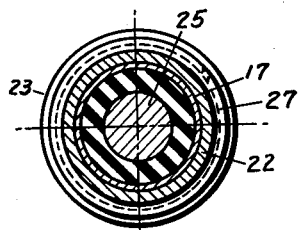
Fig. 4 shows a section on the line 4—4 in Fig. 6.
Figure 5:
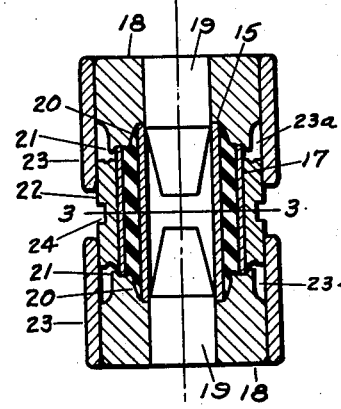
Fig. 5 shows an enlarged section of one of the molding units.

A series of molding units are arranged in the molding tube 1 as shown in Figs. 3 and 5. These units each comprise the following: The device being molded as shown in these figures comprises a central member 15 in the form of a tube; a rubber bushing around this central member and the outer shell 17 around the bushing. Caps 18 of a size to slidingly fit into the molding tube 1 are arranged at each end of a joint or device and have central pins 19 which enter the tubes 15 and center these tubes in the mold. The caps also have the face surfaces 20 which are adapted to fashion the ends of the joint. The caps have the overlapping lips 21 which are adapted to assist in sealing the cavity between the central member 15 and the shell 17. These parts so far as described correspond to similar parts in the patent heretofore referred to.

A pressure tube 22 is arranged around the shell 17, and is centered by extensions 23 on the caps 18; these extensions being conveniently formed by a tube forced over the body of the cap 18. These extensions center the pressure tube, and the pressure tube in turn centers the shell 17. An over-flow space 23a is provided at the ends of the pressure tube 22. The pressure tube is provided with a groove 24 forming shoulders by means of which it may be engaged for the purpose of forcing the pressure tube off the shell 17 on the completion of the operation.

The several units are placed in the molding tube 1, and the entire series are subjected to a pressure of the ram, and every tube receives the full pressure of the ram so as to place the plastic material under very high pressure. The shell 17 is not of sufficient strength to sustain without bulging the pressure to which it is subjected. When, therefore, pressure is exerted, this pressure tube is expanded into engagement with the pressure tube 22. If the shell 17 is so much smaller than the pressure tube, that this expansion extends beyond the elastic limit the ultimate size of the shell will be that of the interior of the pressure tube less the contraction of the shell to the extent of its elastic limit. In this way the pressure tube not only performs the function of preventing undue bulging and distortion of the shell 17, but also effects a sizing of a shell in the molding operation. Upon the completion of the molding operation and a release of pressure on the plastic material within the shell 17, the shell 17 contracts to the extent of the elastic limit and consequently assumes a relation to the pressure tube permitting its comparatively easy removal. With this arrangement it is possible to use a comparatively thin pressure tube and at the same time use very high pressures on the plastic material without effecting an undesirable distortion of the shell.

Figure 6:
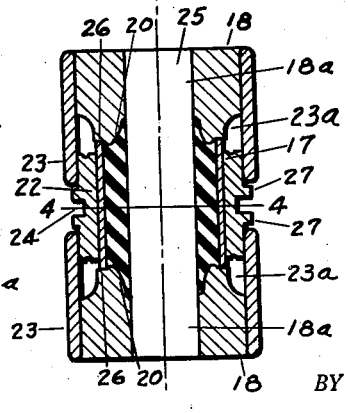
Fig. 6 shows a slight modification of the same.

The modification illustrated in Fig. 6 is much the same as that in Fig. 5. The central member of the joint, however, is a solid pin 25 instead of a tube, the pin being centered by an opening 18a in the body of the cap 18. The closing surface 26 of the cap in Fig. 6 is not provided with the over-lapping lip 21, but depends entirely on the end seating to close the space within the shell. The pressure tube is provided with shoulders 27 which may be engaged with the extensions 23 so as to center the tube axially with relation to the shell.

What I claim as new is:

1. In a plastic molding apparatus, the combination of a molding tube; caps slidingly mounted in the tube having mold faces adapted to form the ends of an article having a bushing of plastic material surrounded by a shell; a non-expansible pressure tube between the caps and having its ends terminating adjacent the mold faces of the caps and adapted to retain through its resistance to expansion the shell of the article against bulging from pressure of the plastic material under pressure of the caps, said pressure tube being removable from the molding tube with the caps; and means exerting pressure on the caps for exerting pressure on the plastic material between the caps.

2. In a plastic molding apparatus, the combination of a molding tube; caps slidingly mounted in the tube having mold faces adapted to form the ends of an article having a bushing of plastic material surrounded by a shell; a non-expansible pressure tube between the caps and having its ends terminating adjacent the mold faces of the caps and adapted to retain through its resistance to expansion the shell of the article against bulging from pressure of the plastic material under pressure of the caps, said pressure tube being removable from the mold with the caps; and means exerting pressure on the caps for exerting pressure on the plastic material between the caps, said pressure tube being spaced from a portion of the cap adjacent the mold faces to permit over-flow.

3. In a plastic molding apparatus, the combination of a molding tube; caps slidingly mounted in the tube and adapted to form the ends of an article having a bushing of plastic material surrounded by a shell; a non-expansible pressure tube between the caps and adapted to retain through its resistance to expansion the shell of the article against bulging from pressure of the plastic material under pressure of the caps, said pressure tube being removable from the mold with the caps; and means exerting pressure on the caps for exerting pressure on the plastic material between the caps, said pressure tube being spaced from the molding tube.

4. In a plastic molding apparatus, the combination of a molding tube; a series of mold units arranged in tandem relation in the molding tube, each mold unit comprising caps having mold faces shaping the ends of an article to be molded and slidingly mounted in the molding tube, and a pressure tube between the caps having ends terminating adjacent to said mold faces and adapted to receive the radial pressure of the article as it is expanded by pressure from the caps, said pressure tubes being separable from the article.

5. The method of curing plastic material in articles having an outer shell and a wall of plastic material within the shell, which consists in providing the shell with a backing pressure tube; enclosing the article and the pressure tube within a heat exchanging medium; closing the shell and exerting pressure on the plastic material; expanding the shell into pressure engagement with the pressure tube and sizing the same; and removing the shell and pressure tube from the medium and the shell from the tube.

6. The method of curing plastic material in articles having an outer shell, a central member within the outer shell and a plastic material between the central member and shell, which consists in placing the shell in a backing pressure tube, enclosing the article within a heat exchanging medium; closing the shell and exerting pressure on the plastic material; expanding the shell into pressure engagement with the pressure tube and sizing the same, while centering the pressure tube and the central member; and removing the shell and pressure tube from the medium, and the shell and central member from the tube.

7. In a plastic molding apparatus, the combination of a molding tube; caps slidingly mounted in the tube having mold faces adapted to form the ends of an article having a bushing of plastic material surrounded by a shell; a nonexpansible pressure tube between the caps having its ends terminating adjacent to the mold faces and adapted to retain through its resistance to expansion the shell of the article against bulging from pressure of the plastic material under pressure of the caps, said pressure tube being removable from the molding tube with the caps; and means exerting pressure on the caps for exerting pressure on the plastic material between the caps, said caps having means for centering the pressure tube with relation to a central pin within the wall of plastic material.

HUGH C. LORD.